United States Patent
Ivanovic et al.

(10) Patent No.: US 11,731,700 B2
(45) Date of Patent: Aug. 22, 2023

(54) FRICTION COMPENSATION FOR VEHICLE SYSTEM CONTROL

(71) Applicant: Ford Global Technologies, LLC, Dearborn, MI (US)

(72) Inventors: Vladimir Ivanovic, Canton, MI (US); Quazi Farooqi, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 17/212,039

(22) Filed: Mar. 25, 2021

(65) Prior Publication Data
US 2022/0306197 A1    Sep. 29, 2022

(51) Int. Cl.
B62D 15/02  (2006.01)
B62D 6/00  (2006.01)
G06V 20/56  (2022.01)

(52) U.S. Cl.
CPC ............ B62D 15/025 (2013.01); B62D 6/00 (2013.01); G06V 20/588 (2022.01)

(58) Field of Classification Search
CPC ............................. B62D 5/046; G06V 20/588
See application file for complete search history.

(56) References Cited

U.S. PATENT DOCUMENTS

| | | | |
|---|---|---|---|
| 8,626,389 B2 * | 1/2014 | Sidlosky | B60G 17/08 180/443 |
| 8,738,231 B2 | 5/2014 | Svensson et al. | |
| 2018/0362080 A1 * | 12/2018 | Shimizu | B60W 50/14 |
| 2019/0315398 A1 * | 10/2019 | Moreillon | B62D 6/10 |
| 2021/0129838 A1 * | 5/2021 | Hultén et al. | B62D 15/025 |
| 2021/0129839 A1 * | 5/2021 | Hultén et al. | B60W 10/20 |

FOREIGN PATENT DOCUMENTS

| | | | |
|---|---|---|---|
| CN | 103863393 A * | 6/2014 | |
| CN | 111619666 A | 9/2020 | |
| JP | 5386873 B2 | 10/2013 | |
| WO | 2019059829 A1 | 3/2019 | |
| WO | WO-2019174452 A1 * | 9/2019 | B62D 6/00 |

* cited by examiner

*Primary Examiner* — Jeff A Burke
*Assistant Examiner* — Jerrod Irvin Davis
(74) *Attorney, Agent, or Firm* — Frank A. MacKenzie; Bejin Bieneman PLC

(57) ABSTRACT

A computer includes a processor and a memory storing instructions executable by the processor to determine a planned curvature of a planned path of a vehicle, determine a friction-compensation torque based on image data received from a camera of the vehicle, and control a steering system of the vehicle based at least in part on the planned curvature and the friction-compensation torque. The friction-compensation torque compensates for friction internal to the steering system.

18 Claims, 4 Drawing Sheets

FRICTION COMPENSATION FOR VEHICLE SYSTEM CONTROL

BACKGROUND

Computers can autonomously or semi-autonomously operate a vehicle as the vehicle travels along a lane of a road. For example, the computer(s) can operate or assist a steering system of the vehicle to maintain a lateral position of the vehicle at a center of the lane, i.e., at a lateral position having a same distance from a right boundary and a left boundary defining the lane. Friction in the steering system can make affect maintaining the lateral position of the vehicle at the center of the lane, e.g., by causing the vehicle to overshoot the center of the lane.

DETAILED DESCRIPTION

Figure 1:
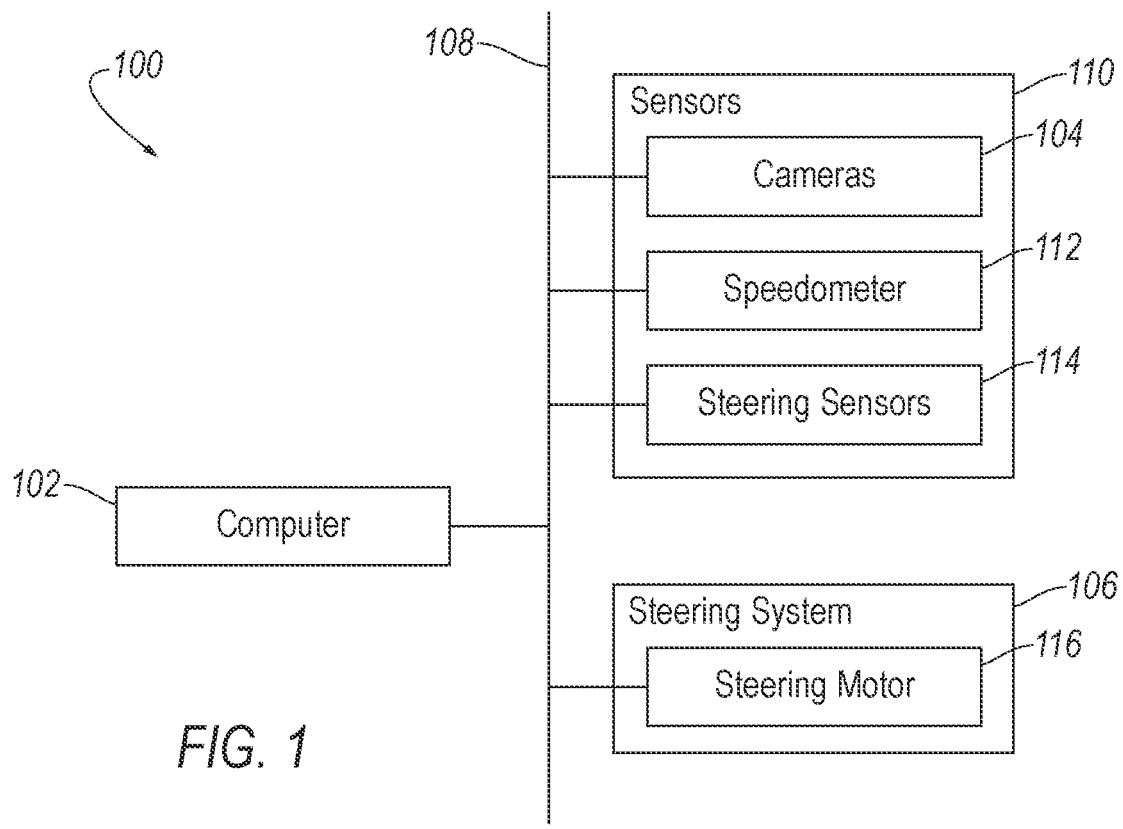
FIG. 1 is a block diagram of an example vehicle.

The present disclosure provides for smooth autonomous or semi-autonomous control of a steering system of a vehicle. The present system and methods can be implemented in, e.g., a lane-centering assist feature, or any other feature for autonomously or semi-autonomously steering the vehicle. By compensating for friction in the steering system, smoother steering than in systems that do not account for friction can be achieved. The friction compensation is determined by using image data from a camera of the vehicle. The image data is typically provided in a vehicle for autonomous or semi-autonomous steering, meaning that present techniques for providing the friction compensation can be implemented without additional sensing hardware. The present disclosure thus advantageously provides friction compensation in a vehicle steering system with low cost and complexity. Moreover, the system can use the image data to provide the friction compensation in a feedforward fashion, i.e., using an input external to the system for control rather than internal. This is better than providing friction compensation using a feedback implementation in which the system tries to minimize error caused by the friction because a feedback system introduces delays between when the error is detected and when the steering system is actuated based on the error. A feedforward system avoids such delays.

A computer includes a processor and a memory storing instructions executable by the processor to determine a planned curvature of a planned path of a vehicle, determine a friction-compensation torque based on image data received from a camera of the vehicle, and control the steering system based at least in part on the planned curvature and the friction-compensation torque. The friction-compensation torque compensates for friction internal to a steering system of the vehicle.

The instructions may further include instructions to determine an uncompensated torque based on the planned curvature, and controlling the steering system may be based at least in part on the uncompensated torque. Controlling the steering system may include actuating a steering motor of the steering system to apply a total torque equal to a sum of the uncompensated torque and the friction-compensation torque.

Determining the uncompensated torque may include minimizing an error between the planned curvature and an actual curvature.

The instructions may further include instructions to determine the planned curvature of the planned path of the vehicle based at least in part on the image data. The instructions may further include instructions to determine a planned velocity of a component of the steering system based on the planned curvature, and determining the friction-compensation torque may be based at least in part on the planned velocity. Determining the friction-compensation torque may include applying a low-pass filter to a sign of the planned velocity, and the sign of the planned velocity may represent a direction of motion of the component of the steering system. The low-pass filter may have a gain equal to a Coulomb friction of the steering system. The Coulomb friction of the steering system may be based on a speed of the vehicle.

The low-pass filter may have a time constant equal to a ratio of a relaxation-length parameter of the steering system and an absolute value of the planned velocity. The relaxation-length parameter may be a ratio of a Coulomb friction of the steering system and a stiffness coefficient of the steering system. The relaxation-length parameter may be based on a speed of the vehicle.

The planned velocity of the component may be proportional to a derivative of the planned curvature with respect to time.

The planned velocity of the component may be an angular velocity.

The instructions may further include instructions to determine a road model based on the image data, the road model may be a polynomial equation that predicts points on a center line of a lane of travel of the vehicle, and determining the planned curvature may be based on the road model.

Determining the friction-compensation torque based on the image data may be feedforward.

Determining the friction-compensation torque may include calculating the friction-compensation torque using a Dahl friction model.

Controlling the steering system may include performing centering of the vehicle within a lane. The instructions may further include instructions to detect boundaries of the lane in the image data.

A method includes determining a planned curvature of a planned path of a vehicle, determining a friction-compensation torque based on image data received from a camera of the vehicle, and controlling the steering system based at least in part on the planned curvature and the friction-compensation torque. The friction-compensation torque compensates for friction internal to a steering system of the vehicle.

With reference to the Figures, a computer 102 includes a processor and a memory storing instructions executable by the processor to determine a planned curvature of a planned path of a vehicle 100, determine a friction-compensation torque based on image data received from a camera 104 of the vehicle 100, and control a steering system 106 of the vehicle 100 based at least in part on the planned curvature and the friction-compensation torque. The friction-compensation torque compensates for friction internal to the steering system 106.

With reference to FIG. 1, the vehicle 100 may be any passenger or commercial automobile such as a car, a truck, a sport utility vehicle, a crossover, a van, a minivan, a taxi, a bus, etc.

The computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 108 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to sensors 110 including the camera 104, a speedometer 112, and steering sensors 114; a steering motor 116 of the steering system 106; and other components via the communications network 108.

The sensors 110 may provide data about operation of the vehicle 100, for example, wheel speed, wheel orientation, and engine and transmission data (e.g., temperature, fuel consumption, etc.). The sensors 110 may detect the location and/or orientation of the vehicle 100. For example, the sensors 110 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 110 may detect the speed of the vehicle 100, e.g., by the speedometer 112. The sensors 110 may detect the external world, e.g., objects and/or characteristics of surroundings of the vehicle 100, such as other vehicles, road lane markings, traffic lights and/or signs, pedestrians, etc. For example, the sensors 110 may include radar sensors, scanning laser range finders, light detection and ranging (LIDAR) devices, and the cameras 104.

The cameras 104 can detect electromagnetic radiation in some range of wavelengths. For example, the cameras 104 may detect visible light, infrared radiation, ultraviolet light, or some range of wavelengths including visible, infrared, and/or ultraviolet light. For another example, the cameras 104 may be a time-of-flight (TOF) cameras, which include a modulated light source for illuminating the environment and detect both reflected light from the modulated light source and ambient light to sense reflectivity amplitudes and distances to the scene. At least one of the cameras 104 is oriented in a vehicle-forward direction and has a field of view encompassing an environment straight forward from the vehicle 100.

The camera 104 generates image data. The image data are a sequence of image frames of the fields of view of the respective cameras 104. Each image frame includes a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the field of view.

The speedometer 112 may be any sensor suitable for measuring the speed of the vehicle 100, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle 100.

The steering system 106 is typically a conventional vehicle steering subsystem and controls the turning of the vehicle wheels 122. The steering system 106 may be a rack-and-pinion system with electric power-assisted steering, a steering-column system, a steer-by-wire system, as are known, or any other suitable system. The steering system 106 can include an electronic control module or the like that is in communication with and receives input from the computer 102 and/or a human driver, e.g., the power-steering control module. The human driver may control the steering system 106 via, e.g., a steering wheel 118, handheld remote control (not shown), etc.

Figure 2:
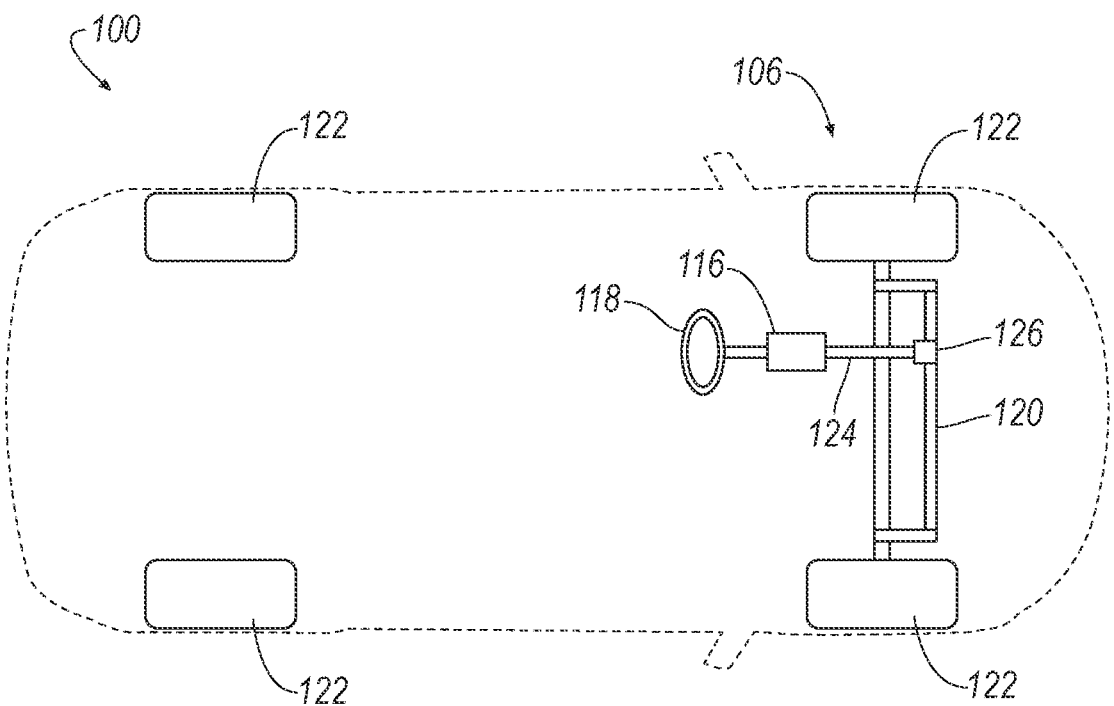
FIG. 2 is a diagram of an example steering system of the vehicle.

With reference to FIG. 2, the steering system 106 may be a conventional rack-and-pinion steering system. Alternatively or additionally, the steering system 106 may be a Pitman-arm system, a rear-steer system, etc. (not shown). A steering rack 120 may be turnably coupled to vehicle wheels 122, for example, in a four-bar linkage. The position of the steering rack 120 determines the turning of the vehicle wheels 122. Translational motion of the steering rack 120 results in turning of the vehicle wheels 122. A steering column 124 may be coupled to the steering rack 120 via a pinion gear 126, that is, gear meshing between the pinion gear 126 and the steering rack 120.

The steering column 124 transfers rotation of the steering wheel 118 to movement of the steering rack 120. The steering column 124 may be, e.g., a shaft connecting the steering wheel 118 to the steering rack 120. The steering column 124 may house a clutch and one or more of the steering sensors 114 such as a torque sensor (not shown).

The steering wheel 118 allows an operator to steer the vehicle 100 by transmitting rotation of the steering wheel 118 to movement of the steering rack 120. The steering wheel 118 may be, e.g., a rigid ring fixedly attached to the steering column 124 such as is known.

The steering motor 116 is coupled to the steering system 106, e.g., drivably coupled to the steering column 124, so as to cause turning of the vehicle wheels 122. For example, the steering motor 116 may be rotatably coupled to the steering column 124, that is, coupled so as to be able to apply a steering torque to the steering column 124. The steering motor 116 may be an electric-power-assist-steering motor, i.e., provide power assist to the steering system 106. In other words, the steering motor 116 may provide torque in a direction in which the steering wheel 118 is being rotated by a human operator, allowing the driver to turn the steering wheel 118 with less effort. During autonomous or semi-autonomous control of the steering system 106, the steering motor 116 can apply torque to the steering column 124 without input from the human operator based on instructions from the computer 102.

Alternatively to the rack-and-pinion steering system, the steering system 106 may be a steer-by-wire steering system, i.e., may have a gap in mechanical linkages between the steering wheel 118 and the vehicle wheels 122. If the vehicle 100 is a fully autonomous vehicle, the steering system 106 may be a steer-by-wire steering system lacking the steering wheel 118 and the steering column 124. The computer 102, e.g., the power-steering control module, may receive signals from the steering sensors 114, e.g., a position sensor positioned to detect the orientation of the steering wheel 118, or may determine a desired turning of the vehicle wheels 122 during autonomous or semi-autonomous control. The position sensor may be, e.g., a Hall effect sensor, a rotary encoder, etc. The computer 102 may output a signal to the steering motor 116. The steering motor 116 may be one or more electromechanical actuators coupled to the steering rack 120 in lieu of the pinion gear 126, and the steering motor 116 may transform the signal into mechanical motion of the steering rack 120.

Returning to FIG. 1, the steering sensors 114 provide data about components of the steering system 106. For example, the steering sensors 114 include wheel-speed sensors positioned to detect rotation of the vehicle wheels 122; position sensors on components of the steering system 106 such as the steering wheel 118, the steering column 124, the steering rack 120, or the pinion gear 126; and torque sensors positioned to detect torques of components of the steering system 106 such as the steering column 124, the pinion gear 126, or the steering motor 116.

Figure 3:
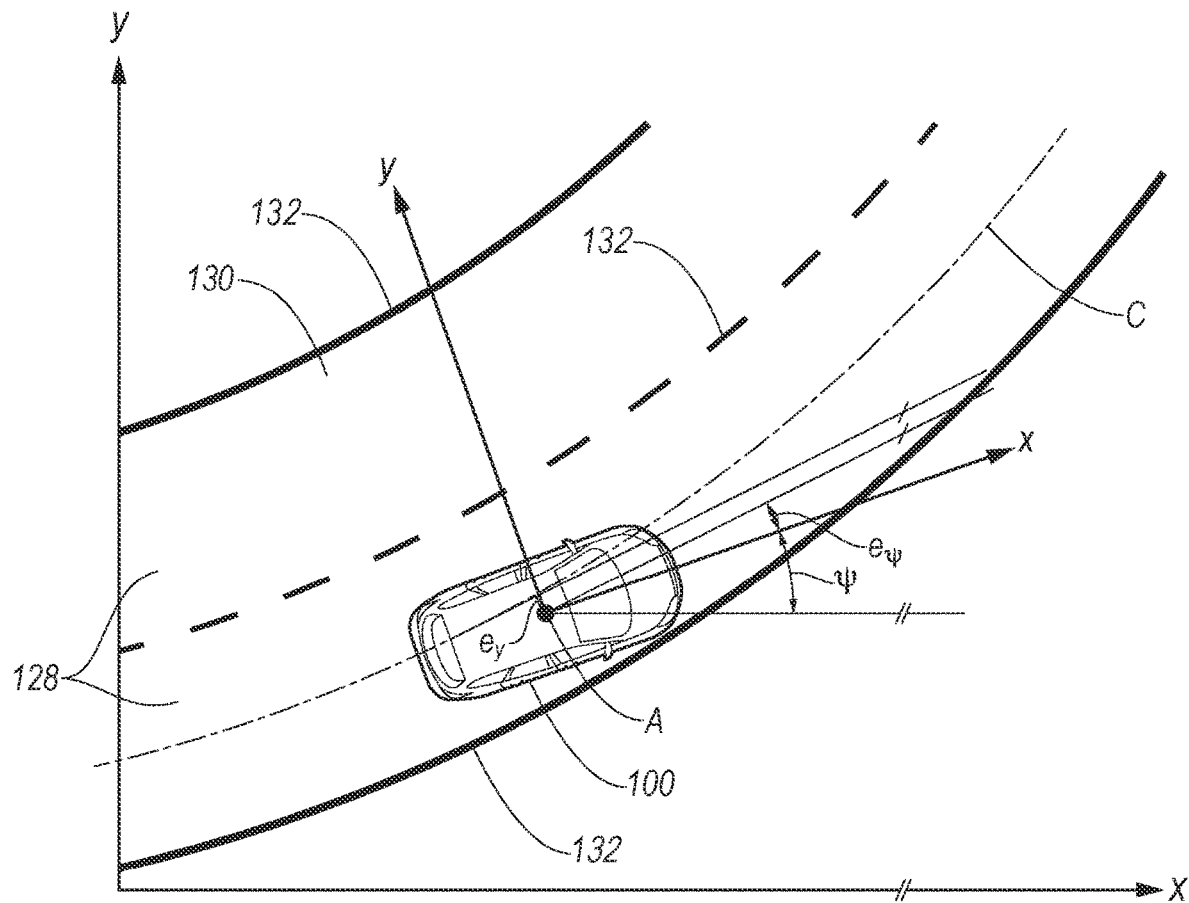
FIG. 3 is a diagram of the vehicle travelling along an example road.

With reference to FIG. 3, the vehicle 100 can travel along a lane 128 of a road 130. The lane 128 is defined by boundaries 132 along lateral edges of the lane 128, and the lane 128 has a center line C. A center line C is typically an imaginary line in a longitudinal direction of the lane 128 having a same lateral distance to the respective right and left boundaries 132 of the lane 128. Thus, a multi-lane road 130 may have multiple center lines C, i.e., one center line C per each lane 128. A shape of the center line C is similar to a shape of the road 130, e.g., the center line C of a straight road 130 is a straight line (i.e., having zero curvature), whereas the center line C of a curved road 130 is a curved line. Thus, the center line C generally defines or matches a curvature of the road 130. The computer 102 may be programmed to detect the boundaries 132 of the lane 128 from the received image data, and to determine the center line C of the lane 128 based on the detected boundaries 132, e.g., by determining an imaginary line with points having a same distance to the respective right and left boundaries 132 of the lane 128. The lane 128 has a lane curvature $\kappa_{road}$, which is a curvature of the center line C of the lane 128. Curvature is the reciprocal of the radius of curvature, e.g., $\kappa_{road}=1/R_{road}$.

FIG. 3 shows a first or local, non-inertial Cartesian coordinate system defined by (i) an origin at a reference point A of the vehicle 100, (ii) an x axis that is defined by a vehicle longitudinal axis through the reference point A, and (iii) a y axis perpendicular to the x axis and defining a vehicle lateral axis through the reference point A. The reference point A can be, e.g., a center of gravity of the vehicle 100.

FIG. 3 further shows a second or global, inertial coordinate system defined by an X axis and a Y axis, e.g., a Cartesian coordinate system, that is independent from location and/or orientation of the vehicle 100. The second coordinate system may be referred to as a "global" coordinate system because it is defined independent of the vehicle 100 and is typically defined for a geographic area, such as the coordinate system of a global positioning system (GPS) that is defined for the world. Alternatively or additionally, the second coordinate system could include any other location coordinate system providing geo-coordinates (i.e., latitude-longitude pairs) or the like.

Position, orientation, and motion of the vehicle 100 in the lane 128 of travel can be described by a speed $V_x$, a heading $\psi$, a position offset $e_y$, a heading offset $e_\psi$, and an actual curvature $\kappa_{veh}$. The speed $V_x$ is a rate of position change in the longitudinal direction, i.e., in a direction of travel of the vehicle 100. The heading $\psi$ is the direction of travel of the vehicle 100. In the present context, the heading $\psi$ of the vehicle 100 is described by an angle between (i) a vehicle longitudinal axis from the reference point A in a direction of forward movement of the vehicle 100, i.e., the x axis of the local coordinate system, and (ii) the X axis of the global coordinate system. The position offset $e_y$ is a distance of the reference point A of the vehicle 100 to a nearest point on the center line C. The heading offset $e_\psi$ is an angle between the direction of the heading $\psi$ of the vehicle 100 and a tangent line to the center line C at the nearest point on the center line C. The actual curvature $\kappa_{veh}$ is a curvature of a path actually followed by the vehicle 100.

Figure 4:
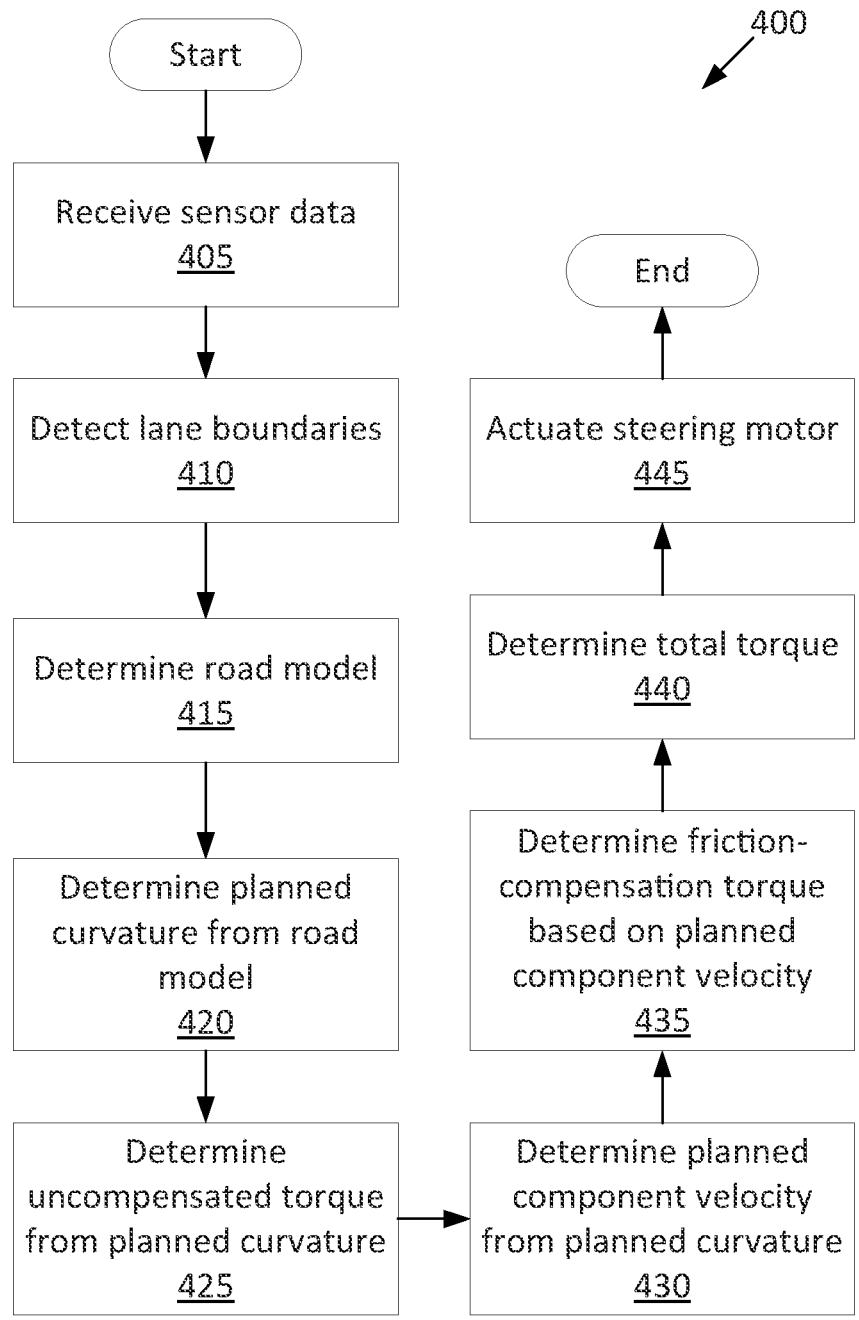
FIG. 4 is a process flow diagram of an example process for controlling the steering system.

FIG. 4 is a process flow diagram illustrating an exemplary process 400 for controlling the steering system 106. The memory of the computer 102 stores executable instructions for performing the steps of the process 400 and/or programming can be implemented in structures such as mentioned above. As a general overview of the process 400, the computer 102 receives data from the sensors 110 including image data from the camera 104, detects boundaries 132 of the lane 128, determines a road model based on the image data, determines a planned curvature $\kappa_{cmd}$ based on the road model, determines an uncompensated torque $T_{unc}$ based on the planned curvature $\kappa_{cmd}$, determines a planned velocity v of a component of the steering system 106 based on the planned and actual vehicle motion curvature, i.e., $\kappa_{cmd}$ and $\kappa_{veh}$, determines the friction-compensation torque $T_{fc}$ based on the planned velocity v of the component, determines a total torque $T_{tot}$ based on the uncompensated torque $T_{unc}$ and the friction-compensation torque $T_{fc}$, and actuates the steering motor 116 to apply the total torque $T_{tot}$.

The process 400 begins in a block 405, in which the computer 102 receives data from the sensors 110, including the image data from the camera 104, the speed $V_x$ of the vehicle 100 from the speedometer 112, and position and/or torque of components of the steering system 106 from the steering sensors 114.

Next, in a block 410, the computer 102 detects the boundaries 132 of the lane 128 in the image data, e.g., using an image histogram or image segmentation. An image histogram is a statistical representation of an intensity distribution of a digital image, e.g., as received from the camera 104. Each pixel of an image received may have an intensity within a predetermined range, e.g., 0% to 100%. The computer 102 may be programmed to identify homogenous regions of the received image based on changes in intensity of image pixels, e.g., gradients, gray levels, etc., and to determine contour points such as the boundaries 132 based on edges, i.e., transition lines between, the identified homogenous regions. Additionally or alternatively, the computer 102 may be programmed to identify the boundaries 132 by performing a segmentation of image data and determining the boundaries 132 based on segmentation results. "Image segmentation" is a process of partitioning a digital image into multiple segments (i.e., sets of pixels). A goal of segmentation is to simplify and/or change a representation of an image so that image data is more meaningful and/or easier to analyze (e.g., by reducing a set of data, e.g., number of pixels, to be analyzed by grouping pixels into segments). Image segmentation includes assigning a label to each pixel in an image such that pixels with the same label share certain characteristics, e.g., being a part of a lane marking. Image segmentation is typically utilized to locate objects and boundaries (lines, curves, etc.) in images, e.g., an image can be segmented by identifying pixels with values, e.g., intensities, colors, etc., in a certain range and assigning the respective value(s), e.g., intensity, color, etc., according to some statistical measure for pixels in the segment, e.g., an average, a max, a min, etc. In some conditions, e.g., inclement weather, the computer 102 may receive image data in which at least portions of the boundaries 132 may lack sufficient data to be detectable. Additionally or alternatively, using conventional curve-fitting techniques, the computer 102 may be programmed to estimate the boundary 132 of the lane 128 in areas where the image data is insufficient, by fitting a curve based on detected portions of the boundary 132, i.e., based on those portions of the boundary 132 that are detectable based on image-processing techniques.

Next, in a block 415, the computer 102 determines a road model based on the image data, e.g., based on the detected boundaries 132 of the lane 128. For example, the road model can be a polynomial equation that predicts points on the center line C relative to the reference point A of the vehicle 100:

$$y_{road}(x) = a_0 + a_1 x + a_2 x^2 + a_3 x^3$$

in which road is $y_{road}$ a lateral distance of the center line C from the reference point A of the vehicle 100 in the local coordinate system, x is a distance ahead of the reference point A of the vehicle 100 in the local coordinate system, and $a_0$-$a_3$ are coefficients from fitting the polynomial to the image data of the road 130. The computer 102 can use the coefficients of the road model to calculate the position offset $e_y$, the heading offset $e_\psi$, the lane curvature $\kappa_{road}$, and the spatial rate of change of the lane curvature $d\kappa_{road}/dx$:

$$e_y = a_0$$

$$e_\psi = a_1$$

$$\kappa_{road} = 2a_2$$

$$\frac{d\kappa_{road}}{dx} = \kappa'_{road} = 6a_3$$

Next, in a block 420, the computer 102 determines the planned curvature $\kappa_{cmd}$ of the planned path of the vehicle 100. The planned curvature $\kappa_{cmd}$ is a curvature that the steering system 106 is commanded to achieve, i.e., a curvature of the planned path that the vehicle 100 will travel along. For example, the computer 102 can determine the planned curvature $\kappa_{cmd}$ from the following equation:

$$\kappa_{cmd} = (\kappa_{road} + \kappa'_{road} D_r) + K_1 e_y + K_2 e_\psi$$

in which $D_r$ is road curvature rate lookahead distance, and $K_1$ and $K_2$ are gains. Using conventional control system design techniques, the gains $K_1$ and $K_2$ may be selected such that poles of the closed-loop system are placed at desired locations, i.e., to achieve desired road-following system performance. In one example, "desired locations" are locations in an s-plane (i.e., the domain resulting from a Laplace transform) that result in a stable control system performance, as known and/or that result in minimum settling time, minimal error, etc.

Next, in a block 425, the computer 102 determines the uncompensated torque $T_{unc}$ based on the planned curvature $\kappa_{cmd}$. For example, the computer 102 can determine the uncompensated torque $T_{unc}$ by minimizing an error between the planned curvature $\kappa_{cmd}$ and the actual curvature $\kappa_{veh}$. Minimizing the error can be implemented by utilizing any suitable control technique, e.g., proportional integral derivative (PID) control. In one example, the actual curvature $\kappa_{veh}$ may be determined based on the yaw rate $r_{veh}$ of the vehicle 100 and the speed $V_x$ of the vehicle 100. For example, the actual curvature $\kappa_{veh}$ may be estimated to be a result of the yaw rate $r_{veh}$ divided by the longitudinal speed $V_x$. In another example, the actual curvature $\kappa_{veh}$ may be determined using dead reckoning techniques, i.e., estimating a tangent line to an actual path followed by the vehicle 100 based on one or more recent location(s) and a current location of the vehicle 100. The block 425 can be performed before, in parallel with, or after blocks 430 and 435.

Next, in the block 430, the computer 102 determines the planned velocity v of a component of the steering system 106 based on the planned curvature $\kappa_{cmd}$. The component of the steering system 106 is a component chosen to be a reference component for the motion of the steering system 106 as a whole, e.g., the steering column 124. The planned velocity v can be a linear velocity or an angular velocity depending on whether the component experiences translation or rotation as the steering system 106 turns the vehicle wheels 122. For the steering column 124, for example, the velocity v is an angular velocity. The planned velocity v of the component is proportional to a derivative of the planned curvature $\kappa_{cmd}$ with respect to time. Determining the planned velocity v from the planned curvature $\kappa_{cmd}$ is described in more detail below with respect to FIG. 5.

Next, in the block 435, the computer 102 determines the friction-compensation torque $T_{fc}$ using the planned velocity v, as described in more detail below with respect to FIG. 5. The friction-compensation torque $T_{fc}$ compensates for friction internal to the steering system 106. As described above with respect to the blocks 410, 415, and 425, the planned velocity v is derived from the image data from the camera 104, which is used to forecast motion of the vehicle 100, and not from data from the steering sensors 114 about the current state of the steering system 106. The determination of the friction-compensation torque $T_{fc}$ is thus feedforward and not feedback, permitting greater responsiveness.

Next, in a block 440, the computer 102 determines the total torque $T_{tot}$ based on the uncompensated torque $T_{unc}$ and the friction compensation torque $T_{fc}$. For example, the total torque $T_{tot}$ is equal to a sum of the uncompensated torque $T_{unc}$ and the friction compensation torque $T_{fc}$, i.e., $T_{tot} = T_{unc} + T_{fc}$.

Next, in a block 445, the computer 102 controls the steering system 106 by, e.g., actuating the steering motor 116 to apply the total torque $T_{tot}$. The control of the steering system 106 is thus based in part on the uncompensated torque $T_{unc}$ and in part on the friction-compensation torque $T_{fc}$. The control of the steering system 106 is based on the planned curvature $\kappa_{cmd}$, which is used to determine the uncompensated torque $T_{unc}$ and the friction compensation torque $T_{fc}$. For example, the computer 102 can control the steering system 106 to perform centering of the vehicle 100 within the lane 128, with the uncompensated torque $T_{unc}$ serving to steer the vehicle 100 toward the center line C and the friction-compensation torque $T_{fc}$ serving to increase the accuracy of the total torque $T_{tot}$ being applied by accounting for the friction in the steering system 106. After the block 445, the process 400 ends.

Figure 5:
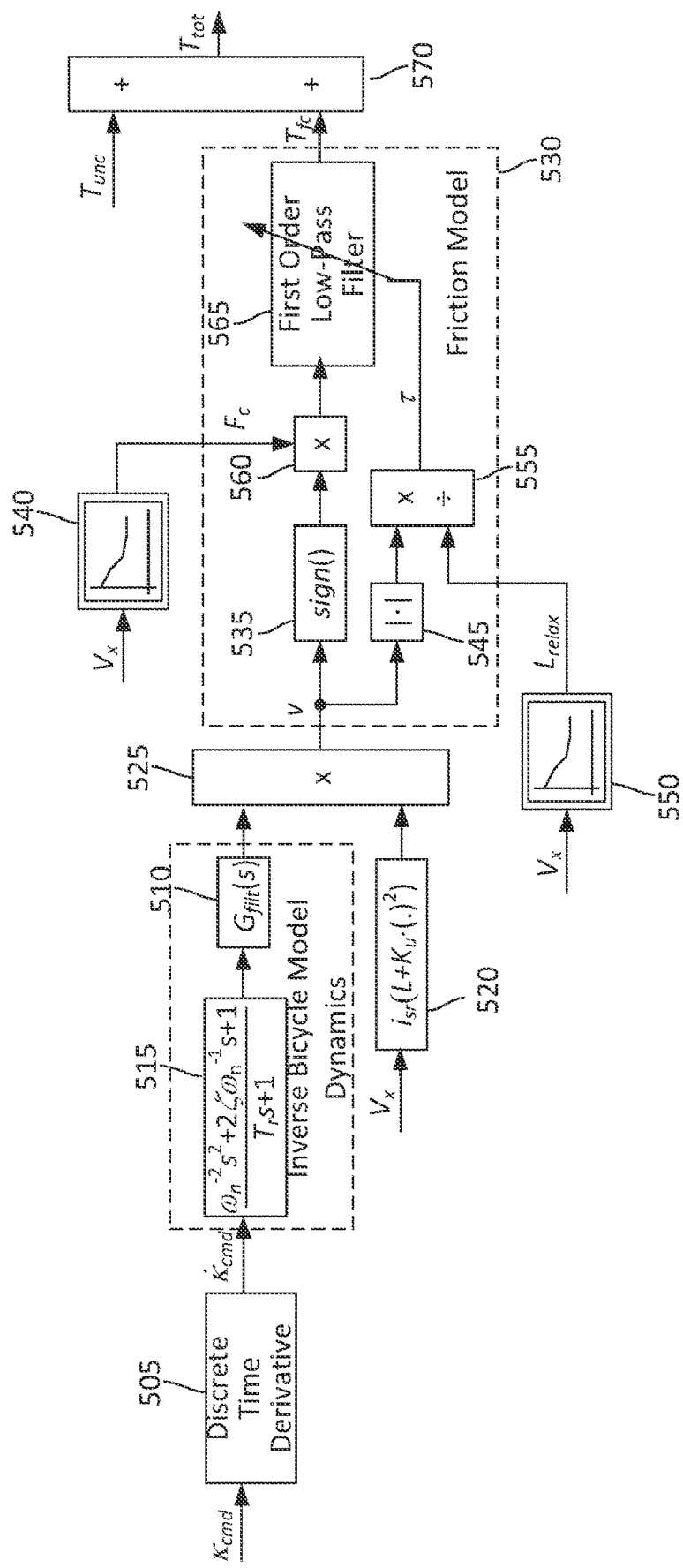
FIG. 5 is a control diagram of an aspect of controlling the steering system.

With reference to FIG. 5, a control diagram 500 is shown for converting the planned curvature $\kappa_{cmd}$ to the friction-compensation torque $T_{fc}$, as mentioned above with respect to the blocks 430 and 435. The memory of the computer 102 stores executable instructions for performing the steps of the control diagram and/or programming can be implemented in structures such as mentioned above. The control diagram 500 begins with receiving the planned curvature $\kappa_{cmd}$, generated as described above with respect to the block 420.

The planned velocity v can be determined from the planned curvature $\kappa_{cmd}$ using a vehicle dynamics model. For example, a vehicle bicycle dynamics model is sufficiently accurate. The planned velocity v is proportional to a derivative of the planned curvature $\kappa_{cmd}$ with respect to time, i.e., $d\kappa_{cmd}/dt$ or $\dot{\kappa}_{cmd}$. For example, the planned velocity v can equal a product of the time derivative of the planned curvature $\dot{\kappa}_{cmd}$ and a transfer function $G_\kappa^v(s)$ in the Laplace domain, as well as possibly a low-pass filter, e.g., as in the following equation:

$$v(s) = G_k^v(s) G_{filt}(s) \dot{\kappa}_{cmd}(s) = \frac{1}{G_{\delta_c}^\kappa(0)} \frac{\omega_n^{-2} s^2 + 2\zeta\omega_n^{-1} + 1}{T_r s + 1} G_{filt}(s) \dot{\kappa}_{cmd}(s)$$

in which $G_{\delta_c}^\kappa(0)$ is a steady-state gain when transferring from a planned steering-column angle $\delta_c$ of the component of the steering system 106 to the planned curvature $\kappa_{cmd}$, $\omega_n$ is the undamped natural frequency, $\zeta$ is the damping factor, $T_r$ is the lead time constant of the vehicle yaw dynamics, and $G_{filt}(s)$ is a low-pass filter to make the total transfer function proper, i.e., a transfer function in in which the degree of the numerator does not exceed the degree of the denominator. The planned angle $\delta_c$ is the integral of the planned velocity v over time. In the control diagram 500, the time derivative of $\kappa_{cmd}$ is represented by a block 505, the low-pass filter $G_{filt}(s)$ by a block 510, the transfer term by a block 515, and the steady-state gain $G_{\delta_c}^\kappa(0)$ by a block 520, combined to determine the planned velocity v in a block 525. The undamped natural frequency $\omega_n$, the damping factor $\zeta$, and the time constant $T_r$ can be determined, e.g., according to the vehicle bicycle dynamics model based on the speed $V_x$ of the vehicle 100 and on physical constants of the vehicle 100, as follows:

$$\omega_n = \frac{1}{V_x} \sqrt{\frac{LC_f C_r}{mI_z}} \sqrt{L + K_u V_x^2}$$

$$\zeta = \frac{m(L_f^2 C_f + L_r^2 C_r) + I_z(C_f + C_r)}{2\sqrt{LmI_z C_f C_r (L + K_u V_x^2)}}$$

$$T_r = \frac{mL_f V_x}{LC_r}$$

in which m is a mass of the vehicle 100, $I_z$ is yaw polar moment of inertia of the vehicle 100, $L_f$ is a longitudinal distance from a center of gravity to a front axle, $L_r$ is a distance from the center of gravity to a rear axle, L is a distance between the axles (i.e., $L=L_f+L_r$), $C_f$ is a front tire cornering coefficient, $C_r$ is a rear tire cornering coefficient, and $K_u$ is an understeering gradient. The understeering gradient $K_u$ is given by this equation:

$$K_u = \frac{L_r C_r - L_f C_f}{C_f C_r} \frac{m}{L}$$

The steady-state gain $G_{\delta_c}^\kappa(0)$ is given by the following equation:

$$G_{\delta_c}^\kappa(0) = \frac{1}{i_{sr}} \frac{1}{L + K_u V_x^2}$$

in which $i_{sr}$ is the steering ratio of the steering system 106. Finally, the low-pass filter can be a first-order or second-order filter, for example:

$$G_{filt}(s) = \frac{\omega_{filt}}{s + \omega_{filt}} \text{ or } \frac{\omega_{filt}^2}{s^2 + 2\zeta_{filt}\omega_{filt}s + \omega_{filt}^2}$$

in which $\omega_{filt}$ is chosen to be greater than the undamped natural frequency $\omega_n$ and inverse of the lead time constant $1/T_r$, and $\zeta_{filt}$ is chosen to be critically damped or overdamped, i.e., $\zeta_{filt} \geq 1$. Using the foregoing equations, the block 525 outputs the planned velocity v of the component of the steering system 106.

The planned velocity v is then passed to a friction model 530. The friction model 530 can be a Dahl friction model, chosen because it captures the relevant friction effects while being simple to calculate. Specifically, using the Dahl friction model captures the effects of Coulomb friction, the effects of presliding deflection, and that static friction is equal to Coulomb friction. Coulomb friction is a maximum kinetic friction between two solid surfaces and is equal to a product of a coefficient of friction and a normal force exerted by each surface on the other. Presliding deflection refers to a slight deformation of components contacting each other before one component slides relative to the other, i.e., before transforming from static to kinetic friction.

Determining the friction-compensation torque $T_{fc}$ is based at least in part on the planned velocity v passed from the block 525. For example, determining the friction-compensation torque $T_{fc}$ includes applying a low-pass filter to a sign of the planned velocity v with a gain equal to the Coulomb friction of the steering system 106, as shown in the following equation in the Laplace domain:

$$T_{fc}(s) = \frac{F_c}{\tau s + 1} \text{sign } v(s)$$

in which $F_c$ is the Coulomb friction of the steering system 106, $\tau$ is a time constant of the low-pass filter, and sign( ) is a function returning a sign, i.e., positive or negative, of its argument. The sign of the planned velocity v represents a direction of motion of the component of the steering system 106, e.g., positive for counterclockwise and negative for clockwise. Returning the sign of the planned velocity v is represented by block 535 in the friction model 530.

The low-pass filter has a gain equal to the Coulomb friction $F_c$ of the steering system 106. The Coulomb friction $F_c$ is based on the speed $V_x$ of the vehicle 100. For example, the memory of the computer 102 can store a schedule relating the speed $V_x$ to the Coulomb friction $F_c$, e.g., a lookup table. The schedule is represented as a block 540. The schedule can be chosen experimentally by choosing values for the Coulomb friction $F_c$ that minimize an error between a measured yaw rate and a yaw rate calculated by a simulation model at different speeds of the vehicle 100:

$$\min_{\sigma_0, F_c} \sum_{i=1}^{n} (r_{meas} - r_{model}(T_{meas}, V_x))^2$$

in which $\sigma_0$ is a stiffness coefficient of the steering system 106, $r_{meas}$ is a measured yaw rate, $r_{model}$ is a yaw rate returned by the model with inputs of a measured total steering torque $T_{meas}$ and the speed $V_x$, and n is the number of the data points in the experiment. The stiffness coefficient $\sigma_0$ is a physical constant of the steering system 106 and is determined experimentally by this same minimization.

The low-pass filter has a time constant τ equal to a ratio of a relaxation-length parameter $L_{relax}$ of the steering system 106 and an absolute value of the planned velocity v, i.e., $\tau = L_{relax}/|v|$. The absolute value is represented as a block 545. The relaxation-length parameter $L_{relax}$ is related to an amount of flexing of the components of the steering system 106 when switching from static to kinetic friction. The relaxation-length parameter $L_{relax}$ is a ratio of the Coulomb friction $F_c$ and the stiffness coefficient $\sigma_0$, i.e., $L_{relax} = F_c/\sigma_0$. Because the Coulomb friction $F_c$ is based on the speed $V_x$ and because the stiffness coefficient $\sigma_0$ is a constant, the relaxation-length parameter $L_{relax}$ is based on the speed $V_x$ of the vehicle 100. For example, the memory of the computer 102 can store a schedule relating the speed $V_x$ to the relaxation-length parameter $L_{relax}$, e.g., a lookup table. The schedule is represented as a block 550. The schedule can be chosen by converting the schedule relating the speed $V_x$ to the Coulomb friction $F_c$. The ratio of the relaxation-length parameter $L_{relax}$ and the absolute value of the planned velocity |v| is represented by a block 555.

In the friction model 530, the planned velocity v is inputted to the block 535, which outputs the sign of the planned velocity v, and to the block 545, which returns the absolute value of the planned velocity v. The speed $V_x$ of the vehicle 100 is provided to the block 540, which returns the Coulomb friction $F_c$, and to the block 550, which returns the relaxation-length parameter $L_{relax}$. The sign of the planned velocity v is multiplied by the Coulomb friction $F_c$ in a block 560, which is outputted to a block 565, representing the low-pass filter. The low-pass filter also receives the time constant τ from the block 555 and outputs the friction-compensation torque $T_{fc}$ to end the friction model 530.

The friction-compensation torque $T_{fc}$ is then provided by the friction model 530 to a block 570 along with the uncompensated torque $T_{unc}$, as described above with respect to the block 425. The block 565 sums the friction-compensation torque $T_{fc}$ and the uncompensated torque $T_{unc}$ and returns the total torque $T_{tot}$. The computer 102 instructs the steering motor 116 to apply the total torque $T_{tot}$, as described above with respect to the block 445.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   determine a planned curvature of a planned path of a vehicle based at least in part on image data received from a camera of the vehicle;
   determine a planned velocity of a component of a steering system of the vehicle based on the planned curvature;
   determine a friction-compensation torque based on the image data and at least in part on the planned velocity, the friction-compensation torque compensating for friction internal to the steering system; and
   control the steering system based at least in part on the planned curvature and the friction-compensation torque.

2. The computer of claim 1, wherein the instructions further include instructions to determine an uncompensated torque based on the planned curvature, and controlling the steering system is based at least in part on the uncompensated torque.

3. The computer of claim 2, wherein controlling the steering system includes actuating a steering motor of the steering system to apply a total torque equal to a sum of the uncompensated torque and the friction-compensation torque.

4. The computer of claim 2, wherein determining the uncompensated torque includes minimizing an error between the planned curvature and an actual curvature.

5. The computer of claim 1, wherein determining the friction-compensation torque includes applying a low-pass filter to a function returning a sign of the planned velocity, and the sign of the planned velocity represents a direction of motion of the component of the steering system.

6. The computer of claim 5, wherein the low-pass filter has a gain equal to a Coulomb friction of the steering system.

7. The computer of claim 6, wherein the Coulomb friction of the steering system is based on a speed of the vehicle.

8. The computer of claim 5, wherein the low-pass filter has a time constant equal to a ratio of a relaxation-length parameter of the steering system and an absolute value of the planned velocity.

9. The computer of claim 8, wherein the relaxation-length parameter is a ratio of a Coulomb friction of the steering system and a stiffness coefficient of the steering system.

10. The computer of claim 9, wherein the relaxation-length parameter is based on a speed of the vehicle.

11. The computer of claim 1, wherein the planned velocity of the component is proportional to a derivative of the planned curvature with respect to time.

12. The computer of claim 1, wherein the planned velocity of the component is an angular velocity.

13. The computer of claim 1, wherein the instructions further include instructions to determine a road model based on the image data, the road model is a polynomial equation that predicts points on a center line of a lane of travel of the vehicle, and determining the planned curvature is based on the road model.

14. The computer of claim 1, wherein determining the friction-compensation torque based on the image data is feedforward.

15. The computer of claim 1, wherein determining the friction-compensation torque includes calculating the friction-compensation torque using a Dahl friction model.

16. The computer of claim 1, wherein controlling the steering system includes performing centering of the vehicle within a lane.

17. The computer of claim 16, wherein the instructions further include instructions to detect boundaries of the lane in the image data.

18. A method comprising:
   determining a planned curvature of a planned path of a vehicle based at least in part on image data received from a camera of the vehicle;
   determining a planned velocity of a component of a steering system of the vehicle based on the planned curvature;
   determining a friction-compensation torque based on the image data and at least in part on the planned velocity, the friction-compensation torque compensating for friction internal to the steering system; and
   controlling the steering system based at least in part on the planned curvature and the friction-compensation torque.

* * * * *